Feb. 20, 1940. G. L. McCARTHY ET AL Re. 21,365
PHOTOGRAPHING APPARATUS
Original Filed March 25, 1925
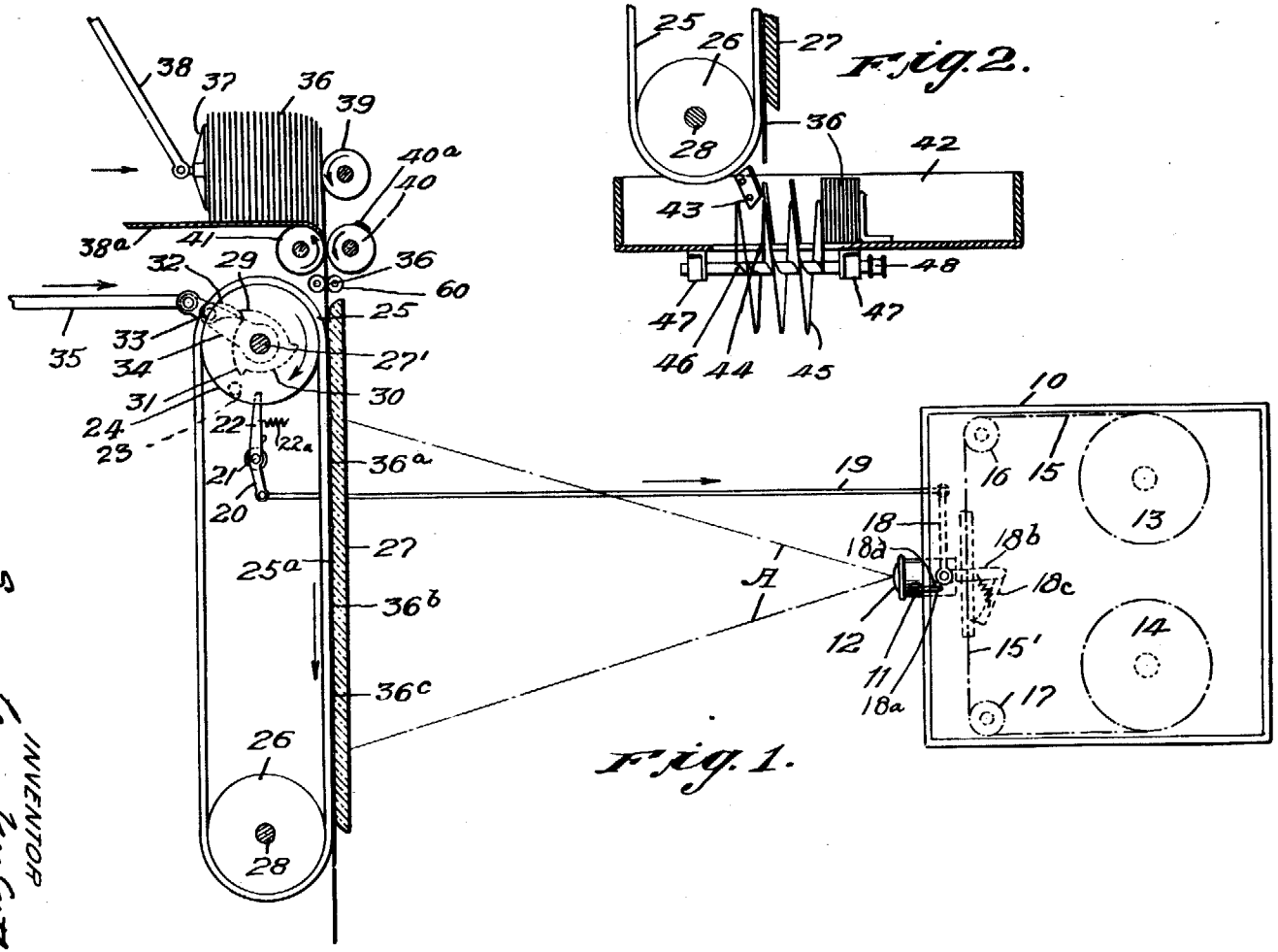
INVENTOR
George Lewis McCarthy
and Abraham Zeevik,
BY
Moses & Wolfe
ATTORNEYS Reissued Feb. 20, 1940 Re. 21,365

UNITED STATES PATENT OFFICE 21,365

PHOTOGRAPHING APPARATUS

George Lewis McCarthy, Rye, and Abraham Novick, Flushing, N. Y.; said Novick assignor to said McCarthy Original No. 1,748,489, dated February 25, 1930, Serial No. 18,075, March 25, 1925. Application for reissue April 11, 1935, Serial No. 15,916

2 Claims. (Cl. 88—24)

This invention relates to the making of photographic records of discrete business documents. An important object of the invention is to provide apparatus for bodily carrying the discrete documents serially into the photographic field of a camera, together with mechanism timing the camera to operate in synchronism with the document feeding apparatus.

The invention finds advantageous employment in effecting the rapid and accurate photographing of bank checks or like documents seriatum. The checks are desirably arranged initially in stack form, are withdrawn from the stack one by one, and are then advanced bodily into the photographic field of a camera.

An important object of the invention is to provide in combination with a camera of the continuous film type and operating means therefor, a mechanism capable of transporting the documents from a receiving station, through the field of view of the camera while maintaining them in a smoothed out condition and guiding them accurately in the focus of the camera, and of then discharging them automatically.

To this end it is a feature that provision is made of an endless document carrier and of a substantially non-obstructing shield opposed thereto for jointly defining a path of movement for the documents compelling them to travel in proper focus of the camera while in the field of view of the latter, the shield bearing against the documents with sufficient force to cause them to be frictionally driven by the carrier in sliding engagement with the shield.

A still further object of the invention is to provide for the photographing of groups of the documents simultaneously, the camera operating mechanism being so timed with relation to the document feeding means that an exposure is effected only after a group of photographed documents has been fed out of the photographic field and has been replaced by a fresh group.

Other features relate to means for initially stacking the sheets in a manner designed to allow each sheet to be picked up at the proper time and automatically fed to exact photographing position; to means for ultimately restacking the several sheets automatically after they have been photographed and as they leave the feeding belt; and to means for automatically and intermittently positioning the sheets in the photographic field to assure that a group of sheets will be in correct photographing position with relation to the camera at the time when an exposure is made.

Other objects and advantages will hereinafter appear.

In the drawing wherein similar reference characters designate similar parts throughout the several views, Figure 1 is a diagrammatic view showing certain parts in section and disclosing the means for photographing the sheets, and Figure 2 is a fragmental detail view of a restacking means cooperating with the present machine.

Referring to the drawing there is disclosed a photographing apparatus or appliance preferably in the form of a camera 10 of the motion picture type, equipped with the usual focusing part 11 carrying the lens 12. On respectively upper and lower unwinding and winding reels 13 and 14 is trained the usual length of film 15 which passes over the idlers 16 and 17 by means of which a stretch of film 15′ is always maintained rectilinearly substantially parallel with the front face of the machine. It will be understood that many parts of this camera have been omitted from the drawing but the camera includes suitable shutter operating and film feeding mechanism actuated by the crank or lever 18. The film feeding mechanism is indicated diagrammatically by the crank arm $18^b$ and pawl $18^c$ and the shutter operating mechanism is indicated by a shutter operating arm $18^a$ in the path of a lug $18^d$ on crank 18.

Connected pivotally to the lever 18 is a link or rod 19 which at its opposite end is connected to one arm 20 of a bell crank lever 20, 22 which is fulcrumed fixedly at 21 and urged in a clockwise direction by spring $22^a$. The arm 22 of the bell crank lever 20, 22 projects into the orbit or path of movement of a pin 23 carried by a roll 24 fixed rotatively upon a shaft 27′ supported in suitable bearings (not shown).

An endless belt 25 is trained upon the roll 24 and also upon another roll 26. These rolls 24 and 26 are positioned respectively at the upper and lower ends of the device, the upper roll 24 being the driving roll for setting the belt in motion. The belt 25 serves for conveying the sheets into position for being photographed, as will be explained hereinafter.

The driven roll 26 is fixed rotatively upon a shaft 28 and is located adjacent the lower end of a preferably vertically disposed transparent shield or glass panel 27, the roll 24 being located at the upper end of this panel or shield 27. The arrangement of rolls 24 and 26 is such that the front stretch $25^a$ of the belt 25 extends substantially parallel with the shield 27 and in close proximity thereto. This belt stretch 25ᵃ and glass panel 27 form a guide through which the sheets to be photographed are conducted so as to be exposed through the glass panel 27.

Also fixed rotatively upon shaft 27′ is a cam or ratchet having a plurality of lobes, say three lobes, 29, 30 and 31, adapted to be successively and intermittently actuated by a driver pawl 32 mounted pivotally upon a pin 33 carried by an arm 34 arranged to turn upon the shaft 27′ during the actuation of the driver or pawl 32. The link 35 serves as a means for operating the arm 34 and pawl 32 by instrumentalities not shown. It will be seen that the roll 24 will be given three strokes during each revolution thereof by reason of which it will move intermittently advancing at each stroke a distance equal to one-third of its circumference. The belt 25 is advanced at each stroke a distance equal to the length of one of the sheets 36. These sheets are shown arranged in the form of a stack supported upon the shelf 38ᵃ located just above the panel 27.

The sheets 36 are disposed vertically in a horizontal column being pressed by a presser 37 carried by an arm 38 into contact with a releasing roll 39 which engages the front sheet and pushes the same downwardly between two rolls 40 and 41. The former of these, roll 40, is provided with a rubber pad 40ᵃ, the purpose of which is to engage the sheet frictionally and insert the same between a pair of feed rolls 60, which feed rolls advance the sheet to the conveyor belt 25. In order to prevent double feeding, as might be caused for example by a plurality of adhering checks moving downwardly together, there is provided the roller 41 which rotates at a low rate of speed in a direction opposite to that of the faster moving feed roller 40. This arrangement causes the sheets to be disengaged from each other and thus prevents the feeding of more than one sheet at a time.

As the checks enter between the belt 25 and panel 27, they are advanced intermittently because of the intermittent actuation of roller 24 as hereinbefore described. The advancing mechanism of the belt is timed with relation to the feed roll 40, there being one advancement of roller 24 and its belt for each rotation of the feed roll. The sheets are thus intermittently advanced behind the glass plate until after a time there will be three blanks in the position indicated at 36ᵃ, 36ᵇ and 36ᶜ embraced within the photographic field A of the lens 12 of the camera, as indicated in the drawing. While the checks are in this position, the camera operates to take an exposure of these three sheets, this operation having been brought about by the actuation of the trip arm 22 and the consequent opening and closing of the shutter of the camera. This operation of the shutter is repeated after three advancements of the feed belt, at which time three new sheets will have been brought into position for being photographed, as indicated in Figure 1. The mechanism thus operates automatically to photograph serially all of the sheets contained in the stack 36. In the present form of embodiment three of such sheets are photographed at a time, but it will be understood that by a simple modification any desired number of sheets may be photographed at one operation. It will be understood that the camera is provided with suitable mechanism well known in the art for advancing the film step by step in accordance with the operation of the shutter so that an unexposed portion of the film is presented to the field of view for each photograph. In the illustrative embodiment the film is advanced by the action of the pin 23 in moving the lever 22 counter-clockwise, and the shutter operating mechanism is actuated by the spring impelled return movement of the arm 22 to normal position. The film thus produced will comprise a series of exposures, each exposure containing the photograph of three of the sheets of the stack. This film may be developed in the usual manner and when desired placed into suitable projection apparatus so that each of the sheets photographed therein may be examined when need therefor arises.

During the continuation of each stroke of the roll 24 and for the interval of each revolution thereof the already photographed checks are advanced and pushed beyond the panel 27 and are ready to be automatically restacked, if desired. Figure 2 shows one method of restacking them. As each photographed check leaves the belt 25 and panel at their lower ends the same is delivered vertically into a container 42 bearing against a fixed stop 43 at one point and against any of a series of vanes 45 mounted upon a feed screw or conveyor 46 trunnioned in suitable bearings 47 and driven through a pulley 48. The vanes of this conveyor carry forward each delivered check whereby they are pressed together in stack formation and at the same time advanced toward one end of the container 42.

The present invention is simple in construction and fool-proof in operation and serves quickly and accurately, successively to feed, photograph and restack a series of similarly-sized sheets such as checks. It will be understood that numerous modifications may be resorted to in practice without departing in principle from the details of construction set forth in the appended claims.

What we claim and seek to protect by Letters Patent is:

1. In apparatus for making a miniature record of documents, in combination, a camera, an endless document driving member traveling across the field of view of the camera in the focal plane thereof for feeding the documents widthwise individually into position for being photographed until a plurality of documents are positioned for photographing, substantially non-obstructing means for holding the documents firmly and smoothly against the driving member in transit and during photographing, and means for actuating the camera automatically when a predetermined number of documents has been thus fed widthwise into position, to photograph them simultaneously, operating means for the document driving member to advance it step by step with an interval between steps to cause the documents to stand still for photographing and to hold them in predetermined positions during the introduction into the apparatus of a following document, said driving member also carrying the photographed documents out of the field of the camera before the camera is again actuated.

2. In apparatus for making a miniature photographic record of a series of checks, in combination, a camera provided with a continuous strip of film, an endless check carrying conveyor means traveling across the field of view of the camera for passing the checks successively widthwise into, through, and out of said field of view under uniform and positive control, a rotary cylinder driving the conveyor means, means for holding the checks firmly and smoothly against the said conveyor means in transit and during photographing with said conveyor means constituting a backing for the checks, said holding means being interposed between the checks and the camera without offering any substantial obstruction to the camera, said conveyor means being of relatively frictional material and said holding means of relatively anti-frictional material, oscillatable means mounted adjacent the cylinder and biased to a normal position with reference to the cylinder, means actuated by the cylinder and disposed adjacent the periphery thereof for causing the said oscillatable means to be operated in response to rotation of the cylinder through an angle corresponding to a continuous check feeding movement of the conveyor means at least equal in extent to the width of a check to perform a cycle of movement from its normal position to a second position and back to normal position, and devices operable by said oscillatable means during such cycle of movement to cause the film to be fed and the check to be photographed.

GEORGE LEWIS McCARTHY.
ABRAHAM NOVICK.